United States Patent [19]

Tripodi et al.

[11] Patent Number: 4,914,541

[45] Date of Patent: Apr. 3, 1990

[54] SOLID-STATE TRIP DEVICE COMPRISING AN INSTANTANEOUS TRIPPING CIRCUIT INDEPENDENT FROM THE SUPPLY VOLTAGE

[75] Inventors: Paul Tripodi, Eybens; Luc Weynachter, Grenoble, both of France

[73] Assignee: Merlin Gerin, France

[21] Appl. No.: 302,610

[22] Filed: Jan. 27, 1989

[30] Foreign Application Priority Data

Jan. 28, 1988 [FR] France .................. 88 01152

[51] Int. Cl.⁴ .............................................. H02H 3/093
[52] U.S. Cl. ........................................ 361/94; 361/86; 361/95
[58] Field of Search .................. 361/44, 47, 86, 91, 361/95, 96, 100, 111, 102, 94

[56] References Cited

U.S. PATENT DOCUMENTS 3,786,311  1/1974  Hobson, Jr. et al. ................. 361/44

4,060,844 11/1977 Davis et al. ............................ 361/96
4,068,283  1/1978 Russell .................................. 361/96

FOREIGN PATENT DOCUMENTS 2403903  8/1974  Fed. Rep. of Germany .
2074804 11/1981 United Kingdom .

Primary Examiner—Todd E. DeBoer
Attorney, Agent, or Firm—Arnold, White & Durkee

[57] ABSTRACT

In a system-powered solid-state trip device, the measurement voltage Vm, representative of the current flowing in the conductor to be protected and applied to the input of an electronic processing unit, can also be applied to the cathode of a thyristor connected in series with the trip coil and receiving on its gate, the tripping orders from the processing unit. A Zener diode is connected between the thyristor gate and the ground so as to set an instantaneous tripping pick-up of the trip device. In this way, a short-circuit in the conductor causes instantaneous tripping of the circuit breaker independently from the value of the supply voltage.

8 Claims, 4 Drawing Sheets

SOLID-STATE TRIP DEVICE COMPRISING AN INSTANTANEOUS TRIPPING CIRCUIT INDEPENDENT FROM THE SUPPLY VOLTAGE

BACKGROUND OF THE INVENTION

The invention relates to a solid-state trip device for an electrical circuit breaker comprising a current detection circuit delivering analog signals proportional to the current flowing through the conductors to be protected, a rectifier, measurement and power supply circuit connected to the current detection circuit and delivering between measurement terminals at least one measurement voltage, an electronic processing unit, supplied by the rectifier, measurement and power supply circuit, and to which the measurement voltage is applied, so that it delivers on an output terminal, with or without a time delay, a circuit breaker tripping order in the event of preset pick-ups being exceeded by said measurement voltage, a trip coil mounted in series with a thyristor being supplied by the rectifier, measurement and power supply circuit, the output terminal of the electronic processing circuit being connected to the thyristor gate, in such a way that the trip coil causes the circuit breaker to open when a tripping order is delivered by the electronic processing unit.

In state-of-the-art solid-state trip devices, the trip coil and thyristor are connected in series between output terminals of the power supply circuit, a tripping order being applied to the thyristor gate.

But the power supply circuit only supplies a sufficient supply voltage a certain time after the circuit breaker has closed. To give an example, a supply voltage rise time of about 35 ms can be considered as being typical. When the electronic processing unit comprises a microprocessor, the latter in addition requires a relatively long initialization time after it has been powered on, typically 30 to 50 ms, and can therefore not provide a reliable tripping order during this period.

This gives rise to a problem when breaking tests are to be carried out with solid-state trip devices. Indeed, operation of the trip device is then masked and delayed by the supply voltage rise time. Yet it is indispensable that a large short-circuit current be detected instantaneously by the circuit breaker.

SUMMARY OF THE INVENTION

The object of the invention is therefore to achieve a system-powered solid-state trip device comprising an instantaneous tripping circuit capable of operating even in the absence of supply voltage.

According to the invention this object is achieved by mounting the thyristor with a floating cathode, the measurement voltage being applied between the ground and the cathode of the thyristor, a Zener diode whose anode is connected to the thyristor gate, and whose cathode is connected to the ground determining an instantaneous tripping pick-up of the trip device.

According to a preferred embodiment, the rectifier, measurement and power supply circuit comprises a rectifier circuit whose inputs are connected to the outputs of the current detection circuit, a power supply circuit being arranged in series with a measurement circuit, delivering the measurement voltage, between the positive and negative output terminals of the rectifier circuit, the point common to the power supply and measurement circuits being connected to the ground. The measurement circuit is preferably formed by a single resistor connected between the negative terminal of the rectifier circuit and the ground. Thus, whereas the trip coil is supplied by a positive voltage with respect to the ground provided by the power supply circuit, a variable negative voltage, representative of the current flowing through the conductor to be protected, is applied to the thyristor cathode, its gate being, in the absence of a tripping order from the electronic processing unit, maintained at a negative voltage by the Zener diode. When the amplitude of the negative measurement voltage applied to the thyristor cathode exceeds a certain pick-up, set by the Zener diode, the thyristor is turned-on and the circuit breaker tripped.

When the trip device is designed for a multipole electrical circuit breaker, either a single measuring resistor or one measuring resistor per phase can be used. In the latter case, the current detection circuit comprising a current sensor per pole, the rectifier, measurement and power supply circuit comprises a plurality of rectifier bridges respectively associated with said poles, and whose inputs are respectively connected to the outputs of the associated current sensor, a rectifier bridge associated with a pole being connected in series with an independent measuring resistor associated with the terminals of a common power supply circuit, the ends of the resistors connected to the power supply circuit being connected to the ground, the other ends of the measuring resistors being respectively connected to the cathodes of a plurality of associated diodes whose anodes are connected to the thyristor cathode in such a way that only the measurement voltage of largest amplitude is applied to the thyristor cathode.

According to a preferred embodiment, the trip device can in addition comprise a temporary modification circuit of the instantaneous tripping pick-up. To achieve this, a resistor is fitted between the Zener diode cathode and the ground, another resistor being fitted in series with a capacitor between the Zener diode cathode and the thyristor cathode.

BRIEF DESCRIPTION OF THE DRAWINGS

Other advantages and features will become more clearly apparent from the following description of several illustrative embodiments of the invention, given as non-restrictive examples only and represented in the accompanying drawings, in which.

DESCRIPTION OF THE PREFERRED EMBODIMENT

Figure 1:
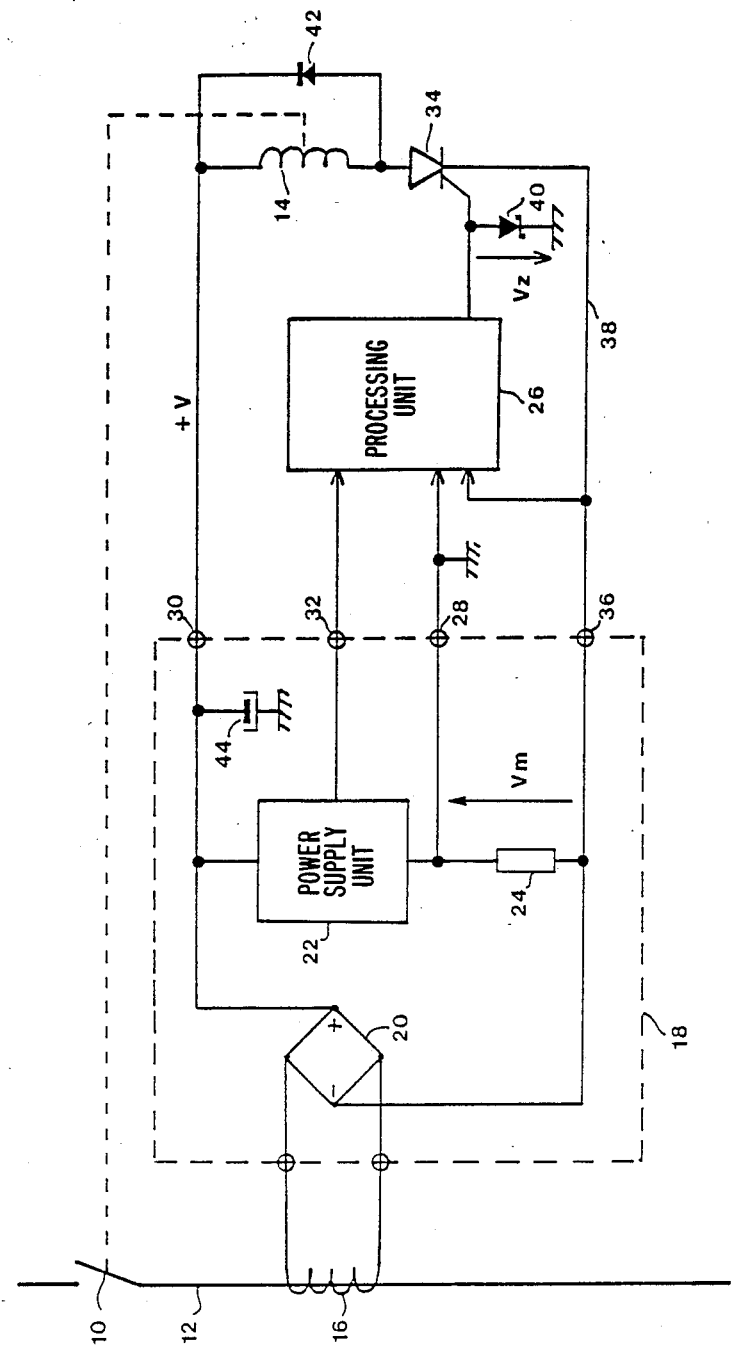
FIG. 1 is a block diagram of a solid-state trip device according to the invention.

In FIG. 1, a circuit breaker 10 protecting at least one conductor 12 is actuated by an operating mechanism controlled by a trip coil 14, in such a way as to bring about tripping of the circuit breaker in the event of an overload or short-circuit.

The current intensity in the conductor 12 is detected by a current transformer 16 whose primary winding is formed by the conductor to be protected and whose secondary winding supplies a signal representative of the current. This signal is applied to the input of a rectifier, measurement and power supply circuit 18.

The circuit 18 comprises a rectifier circuit which, in the case of a single-pole circuit breaker is formed by a full-wave rectifier bridge 20 whose alternating inputs receive the output signal from the current transformer 16.

The rectified signal is applied to a power supply circuit 22 and to a measuring resistor 24. The measurement signal Vm at the terminals of the measuring resistor 24, representative of the current flowing through the conductor 12, is supplied to an electronic processing unit 26. The circuit 18 also delivers a first supply voltage between the output terminals 28 and 30. A second supply voltage, derived from the first, is generally available between an output terminal 32 of the circuit 18 and the terminal 28 to supply the processing unit 26. In the case of a microprocessor-based electronic processing unit 26, this second voltage is preferably close to 5 V.

In the case of a multipole circuit breaker, a current transformer is associated with each conductor of the system to be protected and the output signals from the different transformers are applied to the rectifier, measurement and power supply circuit 18.

Figure 2:
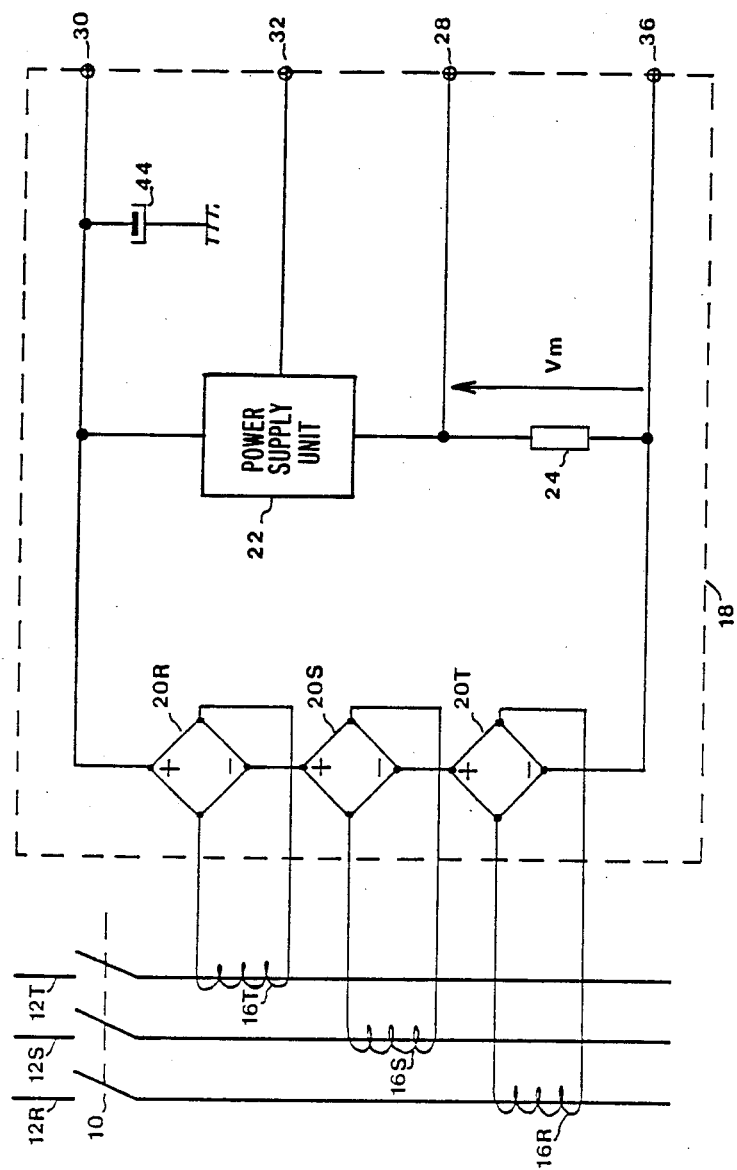
FIG. 2 represents an alternative embodiment of a rectifier, measurement and power supply circuit of a solid-state trip device according to the invention designed for a multipole circuit breaker.

In FIG. 2, the circuit breaker 10 is designed to protect the conductors 12 R, 12 S and 12 T of a three-phase A.C. system. The current intensity flowing in each conductor is monitored by an associated current transformer 16 R, 16 S and 16 T whose secondary winding is connected to a full-wave rectifier bridge 20 R, 20 S and 20 T. The rectifier bridge outputs are connected in series and the total rectified signal is applied to the power supply circuit 22 and to the measuring resistor 24. In this case, the measurement signal Vm is representative of the highest current flowing in one of the conductors.

Naturally, the same principle is applied whatever the number of conductors in the system.

It is also possible (FIG. 3) to supply an independent measurement Vm R, Vm S and Vm T to the electronic processing unit 26, for each phase. An independent measuring resistor 24 R, 24 S, 24 T is then associated with each of the rectifier bridges. Each rectifier bridge is connected in series with the associated measuring resistor to the terminals of the common power supply circuit 22.

The electronic processing unit 26 performs, in a well-known manner, the long delay and short delay trip functions, and possibly the ground-fault protection function, in such a way as to generate a tripping order of the circuit breaker 10 when preset pick-ups are exceeded. The tripping order thus produced is applied by the unit 26 to the gate of a thyristor 34 connected in series with the trip coil 14.

Processing units of this kind are well-known in the art, whether they be of the analog type as in U.S. Pat. No. 4,571,659 or of the microprocessor-based digital type, as in U.S. Pat. No. 4,710,845.

According to the invention a trip device of this kind is to be modified so that it comprises an instantaneous tripping circuit independent from the supply voltage.

Figure 3:
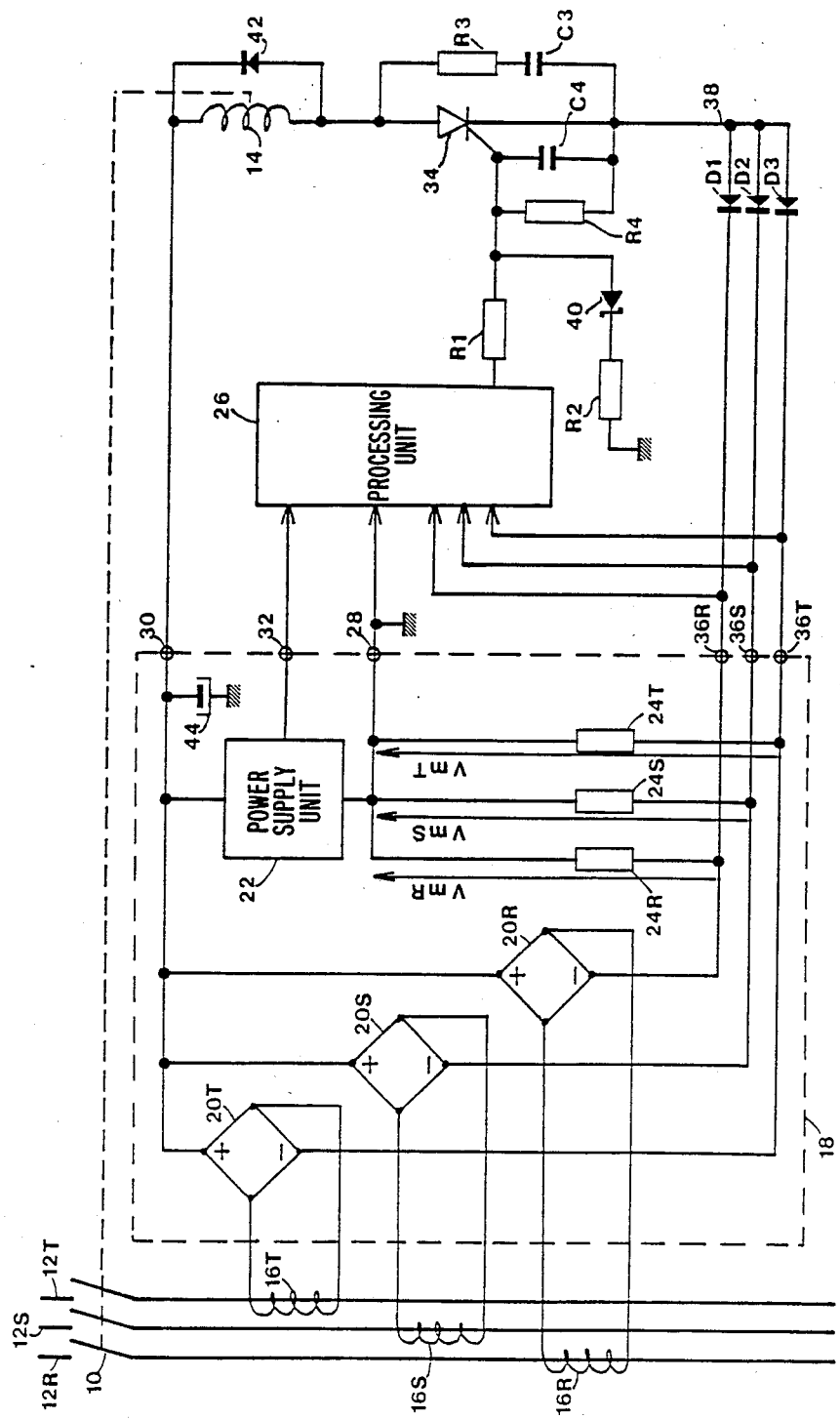
FIG. 3 represents an alternative embodiment of a solid-state trip device for a multipole circuit breaker according to the invention.

As represented in FIGS. 1 and 3, the thyristor 34 is mounted with a floating cathode. Indeed, the trip coil 14 and the thyristor 34 are not connected in series between the output terminals 28 and 30 of the power supply circuit 22 as in state-of-the-art trip devices.

The output terminal 28 of the power supply circuit being connected to ground, the measuring resistor 24 (FIGS. 1 and 2) is connected between the negative terminal of the rectifier circuit and the ground. The measurement voltage Vm is thus available between the ground (output terminal 28) and an output terminal 36 directly connected to the negative terminal of the rectifier circuit. In the case of a multipole circuit breaker with an independent measurement in each phase, the measurement voltages Vm R, Vm S and Vm T are respectively available between the ground terminal 28 and terminals 36 R, 36 S and 36 T respectively connected directly to the negative terminal of the associated rectifier bridge 20 R, 20 S or 20 T.

The trip coil 14 and the thyristor 34 are connected in series between the output terminal 30 and a conductor 38. When there is only one measuring resistor 24 (FIGS. 1 and 2), the conductor 38 is connected directly to the output terminal 36.

Thus, the voltage applied to the thyristor cathode is variable and depends on the measurement voltage Vm. The anode of a Zener diode 40 is connected to the gate of the thyristor 34, its cathode being connected to ground. In the absence of a tripping order, positive with respect to the ground, applied to the gate by the processing unit 26, the gate is at a lower voltage than $|-Vz|$ negative with respect to the ground, Vz being set by the Zener diode 40. So long as the voltage $-Vm$ applied to the thyristor cathode is, in absolute value, lower than the voltage Vz, the thyristor remains off. In the event of a short-circuit in the conductor to be protected, the voltage Vm, proportional to the short-circuit current, exceeds the pick-up voltage constituted by the sum of the voltage Vz and of the pick-up voltage VGK proper to the thyristor, and results in the thyristor being turned-on and current flowing in the trip coil 14 leading to the circuit breaker 10 opening.

An instantaneous tripping circuit whose pick-up is determined by the Zener diode 40 is thus achieved.

At the moment tripping occurs, the thyristor being on, the voltage present between the power supply terminal 30 and the conductor 38, i.e. the voltage applied to the terminals of the trip coil 14, is equal to the sum of the supply voltage V present on the terminal 30 and of the measurement voltage Vm.

To obtain tripping of the circuit breaker, it is sufficient for the voltage at the terminals of the trip coil 14 to be greater than the voltage necessary for the contacts to be opened by the coil. The latter is preferably of the low-impedance type, having a very low opening voltage, which can go down as far as 1 V. In the case of a short-circuit which should give rise to instantaneous tripping, the measurement voltage Vm is, alone, much greater than the opening voltage of the coil and is sufficient, even in the absence of the supply voltage V, to cause tripping of the circuit breaker.

Thus, in the absence of the supply voltage +V, or so long as the latter is insufficient, the measurement voltage Vm acts both as current measurement, for comparison with a tripping pick-up set by the Zener diode 40, and as supply voltage to the trip coil.

As represented in FIG. 1, a diode 42 is, in a classical manner, mounted in parallel on the trip coil 14. The capacitor 44, connected between the power supply terminal 30 and the ground serves the purpose, in normal operation of the trip device, of stabilizing the supply voltage V, and of supplying the tripping power in the event of a long delay, short delay or ground fault.

In the case where the circuit 18 delivers an independent measurement voltage Vm R, Vm S, Vm T for each phase (FIG. 3), the conductor 38 is connected to the anodes of diodes D1, D2, D3, whose cathodes are respectively connected to the terminals 36 R, 36 S, 36 T. The diodes thus form an analog OR circuit, applying the maximum amplitude voltage detected Vm R, Vm S or Vm T to the cathode of the thyristor 34.

Operation is then the same as in the instantaneous tripping circuit according to FIG. 1, the D.C. voltage at the terminals of the diodes being added to the voltage Vz and to the pick-up voltage VGK to fix the instantaneous tripping pick-up.

As soon as one of the measurement voltages exceeds this instantaneous tripping pick-up, the thyristor 34 is turned-on and the trip coil 14 has a sufficient current flowing through it to cause the circuit breaker 10 to open, whatever the value of the supply voltage V.

As represented in FIG. 3, a resistor R1 can be fitted between the tripping output of the processing unit 26 and the thyristor gate in such a way as to limit the gate current. Similarly, a current limiting resistor R2 can be connected in series with the Zener diode 40 between the gate and the ground.

Interference suppression RC circuits are preferably connected between the anode and the cathode of the thyristor 34 on the one hand—resistor R3 and capacitor C3 in series, and between the gate and the cathode of the thyristor on the other hand—resistor R4 in parallel with a capacitor C4.

It may in addition be advantageous to provide the instantaneous tripping circuit described above with a provisional selectivity, called override selectivity, for a very short time, when a short-circuit is detected, so as to possibly enable a downstream circuit breaker to open if the fault, although higher than a first instantaneous tripping pick-up, appreciably equal to Vz, is lower than a second tripping pick-up higher than the first.

To achieve this, the tripping pick-up S is temporarily raised when a fault is detected by the measuring resistor.

Figure 4:
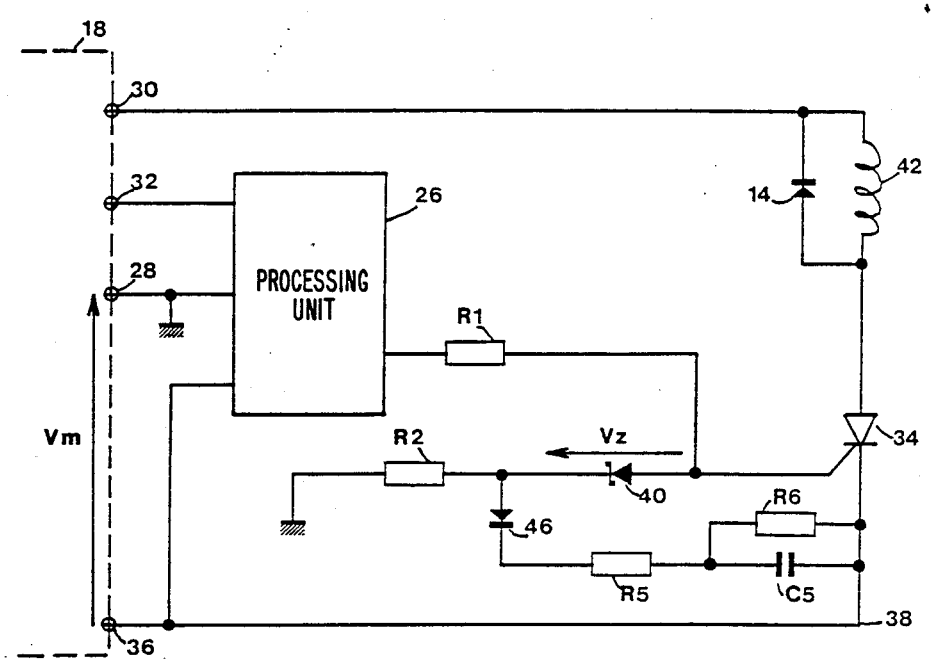
FIG. 4 represents a part of the trip device according to FIG. 1, fitted with a temporary modification circuit of the instantaneous tripping pick-up.

As represented in FIG. 4, this is achieved by means of a circuit, comprising in series a resistor R5 and a capacitor C5, connected between the cathode of the thyristor 34 and the point common to the cathode of the Zener diode 40 and a resistor R2 fitted between the Zener diode and the ground.

In the absence of a fault, the measurement voltage Vm is nil and the capacitor C5 is discharged, no current flowing in the resistors R5 and R2. When a fault occurs, at the time "to", the voltage Vm is no longer nil and a charging current flows through the capacitor C5, the resistor R5 and the resistor R2.

If the voltage VGK and, in the circuit according to FIG. 3, the voltage drop in the diodes D1, D2, D3, are ignored, the absolute value of the pick-up voltage S that Vm has to reach to gate the thyristor 34 is then given by:

$$S = Vz(R5+R2)/R5.$$

As the capacitor C5 charges with a time constant $\tau = (R2+R5) C5$, after a time $t=\tau$, the voltage at the terminals of the capacitor is equal to Vm and the pick-up S returns to Vz. As a non-restrictive example, a capacitor charging time constant of around 10 ms can be chosen.

Figure 5:
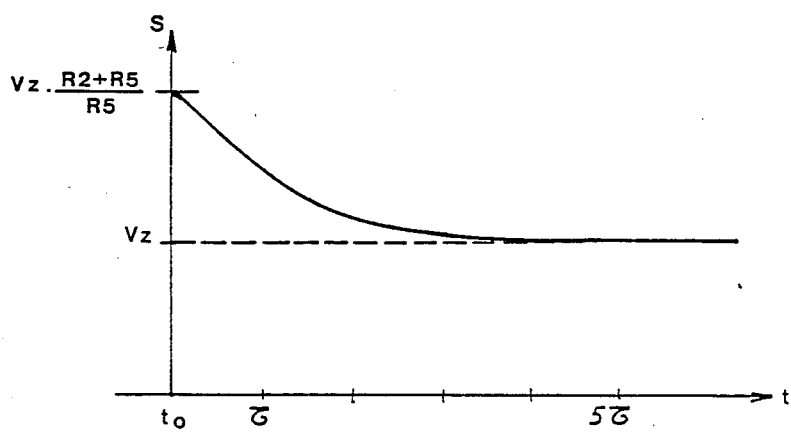
FIG. 5 illustrates the variation of the instantaneous pick-up of the trip device according to FIG. 4.

FIG. 5 illustrates the variation of the tripping pick-up versus time. It can be seen that the pick-up is high when the fault is detected, at the time to, this pick-up decreasing very quickly to return to its nominal value Vz after a time corresponding to 5 times the charging time constant of the capacitor C5.

A discharging resistor R6, of a much higher value than the resistor R5, is connected in parallel with the capacitor C5, so as to enable the capacitor to discharge when the fault has been cleared.

The measurement voltage Vm being a rectified full-wave voltage, its amplitude varies sinusoidally during one half-period. To avoid the capacitor C5 discharging after the voltage Vm has reached its peak value, a diode 46 is fitted in series with the resistor R5 and the capacitor C5.

As an example, the value of the voltage Vz may be close to 6 or 7 V, the supply voltage V being in the order of 20 V.

We claim:

1. A solid-state trip device for a multipole electrical circuit breaker comprising:
   a current detection circuit delivering analog signals proportional to the current flowing through conductors to be protected and comprising one current sensor per pole,
   a rectifier, measurement and power supply circuit comprising a plurality of rectifier bridges respectively associated with said poles, the inputs of a rectifier bridge being connected to the outputs of the associated current sensor, a rectifier bridge associated with a pole being connected, in series with an independent associated measuring resistor, between terminals of a common power supply circuit, each resistor comprising first and second terminals, said first terminal, connected to the power supply circuit, being connected to ground, measurement voltages being generated across the measurement resistors,
   an electronic processing unit receiving said measurement voltages and receiving a supply voltage from the common power supply circuit, said processing unit delivering on an output terminal, with or without a time delay, a circuit breaker tripping order in the event of preset pick-ups being exceeded by said measurement voltages,
   a plurality of diodes respectively associated with said measuring resistors, the cathode of a diode being connected to the second terminal of the associated resistor and the anodes of the diodes being connected together,
   a trip coil connected in series with a thyristor between a supply terminal of the power supply circuit and the anodes of the diodes, the output terminal of the electronic processing unit being connected to the thyristor gate in such a way that the trip coil causes the circuit breaker to open when a tripping order is delivered by the electronic processing unit,
   a Zener diode having its anode connected to the thyristor gate and having its cathode connected to ground, for determining an instantaneous tripping pick-up of the trip device.

2. The trip device according to claim 1, wherein a limiting resistor is connected between the output terminal of the electronic processing unit and the gate of the thyristor.

3. The trip device according to claim 1, wherein a limiting resistor is connected in series with the Zener diode, between the gate of the thyristor and the ground.

4. A solid-state trip device for an electrical circuit breaker comprising:
- a current detection circuit delivering analog signals proportional to the current flowing through conductors to be protected,
- a rectifier, measurement and power supply circuit connected to the current detection circuit and delivering between measurement terminals at least one measurement voltage,
- an electronic processing unit, receiving a supply voltage from the rectifier, measurement and power supply circuit, and to which the measurement voltage is applied, said electronic processing unit delivering on an output terminal, with or without a time delay, a circuit breaker tripping order in the event of preset pick-ups being exceeded by said measurement voltage,
- a trip coil mounted in series with a thyristor being supplied by the rectifier, measurement and power supply circuit, the output terminal of the electronic processing unit being connected to the thyristor gate in such a way that the trip coil causes the circuit breaker to open when a tripping order is delivered by the electronic processing unit, the thyristor being mounted with a floating cathode, the measurement voltage being applied between ground and the cathode of the thyristor,
- a Zener diode having its anode connected to the thyristor gate and having its cathode connected to ground for determining an instantaneous tripping pick-up of the trip device,
- and a circuit for temporarily modifying the instantaneous tripping pick-up comprising a resistor coupled between the cathode of the Zener diode and the ground, a further resistor being connected in series with a capacitor between the cathode of the Zener diode and the cathode of the thyristor.

5. The trip device according to claim 4 wherein a discharging resistor, of high value, is connected in parallel with said capacitor.

6. The trip device according to claim 4 wherein a diode is connected in series with said further resistor and with said capacitor.

7. The trip device according to claim 4, wherein a limiting resistor is connected between the output terminal of the electronic processing unit and the gate of the thyristor.

8. The trip device according to claim 4, wherein a limiting resistor is connected in series with the Zener diode between the gate of the thyristor and the ground.

* * * * *